United States Patent
Wartman et al.

(10) Patent No.: US 10,159,258 B1
(45) Date of Patent: Dec. 25, 2018

(54) FOLDING APPARATUS AND PARTIAL PRESS FOR SUBMARINE SANDWICHES

(71) Applicants: Norman Wartman, Miami, FL (US);
Daniel Pijeira, Stafford, VA (US);
Omar A Tavarez, Miami, FL (US);
Carlos Bonilla, Miami, FL (US)

(72) Inventors: Norman Wartman, Miami, FL (US);
Daniel Pijeira, Stafford, VA (US);
Omar A Tavarez, Miami, FL (US);
Carlos Bonilla, Miami, FL (US)

(73) Assignee: AUTOMATED SYSTEMS & SOLUTIONS, INC., Miami, FL (US)

( * ) Notice: Subject to any disclaimer, the term of this patent is extended or adjusted under 35 U.S.C. 154(b) by 0 days.

(21) Appl. No.: 15/130,700

(22) Filed: Apr. 15, 2016

Related U.S. Application Data (60) Provisional application No. 62/148,480, filed on Apr. 16, 2015.

(51) Int. Cl.
*A21C 15/00* (2006.01)
*A21C 9/06* (2006.01)
*A23P 30/00* (2016.01)
*A23P 20/20* (2016.01)

(52) U.S. Cl.
CPC .......... *A21C 15/007* (2013.01); *A21C 9/063* (2013.01); *A23P 20/20* (2016.08); *A23P 30/00* (2016.08)

(58) Field of Classification Search
CPC ......... A21C 3/022; A21C 9/063; A23P 30/00; A23P 20/20
USPC ................. 99/450.6, 450.5, 450.4, 450.2
See application file for complete search history.

(56) References Cited

U.S. PATENT DOCUMENTS

| | | | |
|---|---|---|---|
| RE17,114 E | 9/1928 | Chandler | |
| 1,728,751 A | 9/1929 | Forshee | |
| 1,748,309 A | 2/1930 | Rose | |
| 2,577,925 A * | 12/1951 | Sternbach | A21C 9/063 425/511 |
| 3,494,303 A * | 2/1970 | Shiffer | A21C 15/007 425/113 |
| 3,611,950 A * | 10/1971 | Battaglia | A21B 5/02 99/353 |
| 3,669,007 A * | 6/1972 | Pulici | A21C 9/063 425/110 |
| 4,091,720 A | 5/1978 | Wheeler | |

(Continued)

FOREIGN PATENT DOCUMENTS

JP      57005675      1/1982

*Primary Examiner* — Reginald L Alexander
(74) *Attorney, Agent, or Firm* — Malin Haley DiMaggio & Bowen, P.A.

(57) ABSTRACT

An improved assembly for automatically folding and pressing submarine sandwiches in line production. Once a preparer has assembled the sub with the customer's selection of meats and vegetables, it is placed on the assembly to quickly and efficiently prepare the sub for cutting, wrapping and delivery without uncoordinated or awkward handling by the employee and the loss of ingredients. The assembly includes a conveyor belt for movement of the sandwiches into a curvilinear channel having a converging outlet which provides the dual functions of folding and pressing the sandwich, following which it ready for packaging and/or delivery to a customer. In other embodiments, the assembly includes a plurality of hinged plates, a central press down bar, and options for a hand crank or foot pedal control.

12 Claims, 12 Drawing Sheets

(56) References Cited

U.S. PATENT DOCUMENTS

| | | |
|---|---|---|
| 4,454,620 A | 6/1984 | Barkdull, Jr. |
| 5,664,486 A * | 9/1997 | Atwood ................ A21C 9/088 |
| | | 425/321 |
| 6,001,403 A * | 12/1999 | Kobayashi ............ A21C 9/061 |
| | | 425/335 |
| 6,012,191 A | 1/2000 | Caldwell |
| 7,726,236 B2 | 1/2010 | Graham et al. |
| 2006/0134271 A1 | 6/2006 | Proper et al. |
| 2010/0189854 A1 | 7/2010 | Assius |

* cited by examiner

FOLDING APPARATUS AND PARTIAL PRESS FOR SUBMARINE SANDWICHES

CROSS REFERENCE TO RELATED APPLICATIONS

This application claims the benefit of U.S. Provisional Application No. 62/148,480, filed on Apr. 16, 2015.

STATEMENT REGARDING FEDERALLY SPONSORED RESEARCH OR DEVELOPMENT

N/A

BACKGROUND OF THE INVENTION

1. Field of the Invention

The present invention relates generally to an improved apparatus for making sandwiches, and more particularly to a mechanical device for automatically folding and partially pressing submarine sandwiches during preparation and delivery.

2. Description of the Prior Art

Known and conventional sandwich making units, toasters, and components relate to a variety of distinct devices which include receiver bins, hinge hardware, folding features and support housings.

For example, U.S. Patent Application Publication No. 2010/0189854, entitled Method, Apparatus and System for Preparing Sandwiches, discloses a device which includes filling a support dish with edible product, meats, vegetables, and/or spices and thereafter placing the support dish upon a "tilting dish". The tilting dish is rotatable within a housing, such that the edible food product slides and is placed within a receiving bun, sandwich roll, bread, dough or the like.

The Japanese Patent No. 57005675, entitled Preparation of Sandwich and Container, discloses a particular tray for folding sandwiches, in which bread portions are placed in opposite sections of the tray, sandwich fillings are selectively applied, and the tray folds over to complete the sandwich.

The U.S. Patent Application Publication No. 2006/0134271, entitled Method and Apparatus for Making a Sandwich, illustrates a sandwich assembly tool and specific methods for making a sandwich, which may be hot or cold. Either pre-assembled fillings and garnishments can be utilized, or alternatively with simultaneous preparation of sandwich components. Trays having one or two main cavities are designed to accept food product, and the tool includes raised sections for placement against a hinge section of the bread components.

The U.S. Pat. No. 7,726,236, entitled Sandwich Maker, relates to a device which incorporates a base section in a perforating member. A top section is rotatable through hinge and pivot points, and the perforating member is designed to cut slits into sections of the dough or bread portion placed within the base unit.

However, none of the above-referenced patents or the prior art address the designs, components and/or operation of the instant sandwich folding and partial press assembly, which constitutes a substantial improvement over the art. The instant inventions constitute an automatic operation for eliminating time consuming human steps in assembly line operations for producing multiple submarine sandwiches.

It is therefore an objective of the present invention to provide an improved device for the preparation and delivery of submarine sandwiches, particularly in assembly lines for restaurants or high volume facilities.

It is yet another objective of the present invention to provide an improved device for the preparation and delivery of submarine sandwiches which eliminates problems with prior designs and provides enhanced benefits for eliminating time consuming steps and assists in automating the process.

Finally, it is an objective of the present invention to provide to provide an improved device for the preparation and delivery of submarine sandwiches which is cost effective and operationally efficient while incorporating the above mentioned objects and features.

SUMMARY OF THE INVENTION

The instant assembly maximizes efficiencies in the making of submarine and deli sandwiches in line operation sub shops such as Subway®, Firehouse Subs®, Quiznos®, and the like. Once the preparer has assembled the sub with the customer's selection of meats and vegetables, it is placed on/within the folding/partial press to quickly and efficiently prepare the sub for cutting, wrapping and delivery without uncoordinated or awkward handling by the employee and the loss of ingredients. It certain embodiments, the assembly includes a conveyor belt for movement of the sandwiches into a curvilinear partially open tunnel having a converging outlet which provides the dual functions of folding and pressing the sandwich, following which it ready for packaging and/or delivery to a customer. In other embodiments, the assembly includes a plurality of hinged plates, a central press down bar, and options for a hand crank or foot pedal control.

BRIEF DESCRIPTION OF THE DRAWINGS

The invention may be better understood by reference to the drawings in which.

DETAILED DESCRIPTION OF PREFERRED EMBODIMENTS

With the increase of fast food restaurants, particularly the sandwich style eateries, a growing inefficiency in the preparation of the meal has become apparent. The instant assembly and design provides a small, inexpensive, safe, efficient and practical machine that will significantly reduce the time it takes to complete assembly of a sub. This type of approach has never been implemented in a high output commercial setting, but with the FDA and ISO regulations.

One main issue overcome was the amount of time employees devoting to wrapping, cutting and folding the sub-sandwich when they could be assisting other customers with their food. By improving on the wrapping step the amount of product made and the attention to the customers will increase.

The assemblies disclosed herein combine electro-mechanical concepts and a new design for the machine eliminating the tedious step of wrapping and folding the product. This frees the employee from taking time to wrap and fold and instead they will be able to assist another customer and improve sells. In the process of wrapping the product can be placed in a sealed bag to prolong freshness and flavor.
One of the main purposes of designing this system is to reduce a tedious, time consuming task that is nonetheless necessary in the workplace today. In doing so, this improvement allows employees of these various businesses to instead focus their attention to other tasks that could make them more efficient. In addition to easing the process, we aim to utilize technology to expand the life of the end product.

Figure 1:
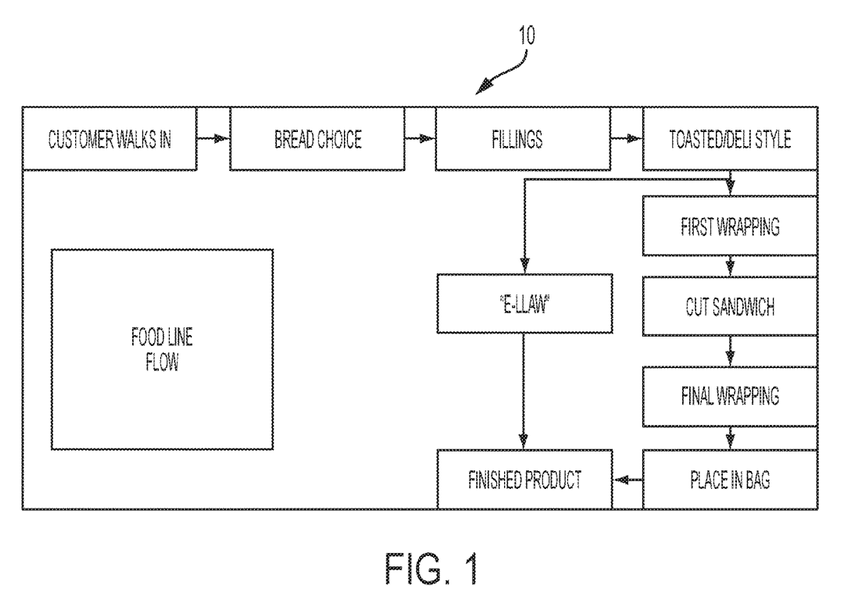
FIG. 1 is a diagrammatic flow chart illustrating the process of food line flow to a customer.

With reference to FIG. 1, flowchart 10 illustrates the typical process of a customer ordering a submarine sandwich in the food line of a restaurant. The sequence illustrates a patron making typical choices of bread type, vegetables and accompanying fillings, and including the employee's process of wrapping or initial folding of the sub, cutting sandwich, followed by final wrapping in a plastic or bag, and delivering the product to the customer. FIG. 1 also depicts the shortcut of the instant invention, through flow E-LLAW and delivering the finished product.

Figure 2A:
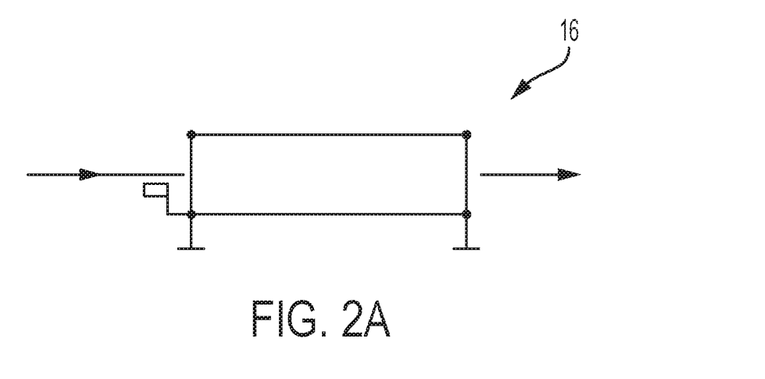
FIG. 2A is a side view illustrating one embodiment of the instant inventions having hinged plates and a press mechanism.
Figure 2B:
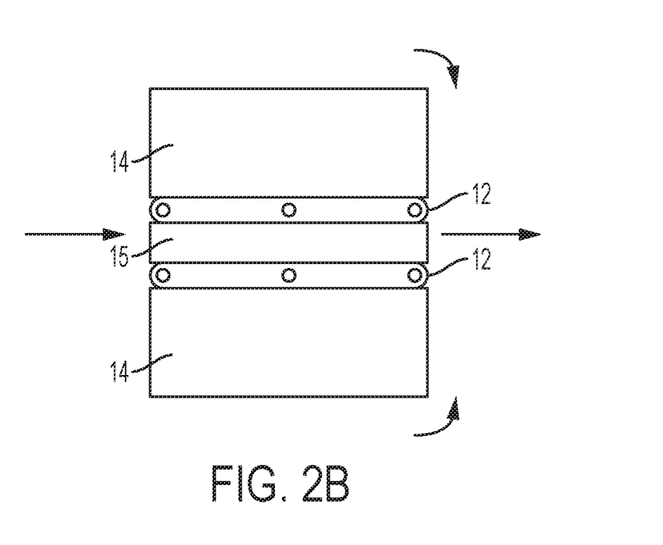
FIG. 2B is a top plan view illustrating the embodiment of the instant inventions having hinged plates and a press mechanism.

With reference to FIG. 2B, this depicts a top plan view of an alternative embodiment of the instant inventions, having a plurality of plates 14 and 15 rotatably mounted to hinges 12. FIG. 2B is a side view of the apparatus shown in FIG. 2B, wherein a fold down press or food bar 16 is utilized to both fold and partially press submarine sandwich at the appropriate time. A hand crank or foot operated mechanical component is utilized to operate the bar 16.

Figure 3:
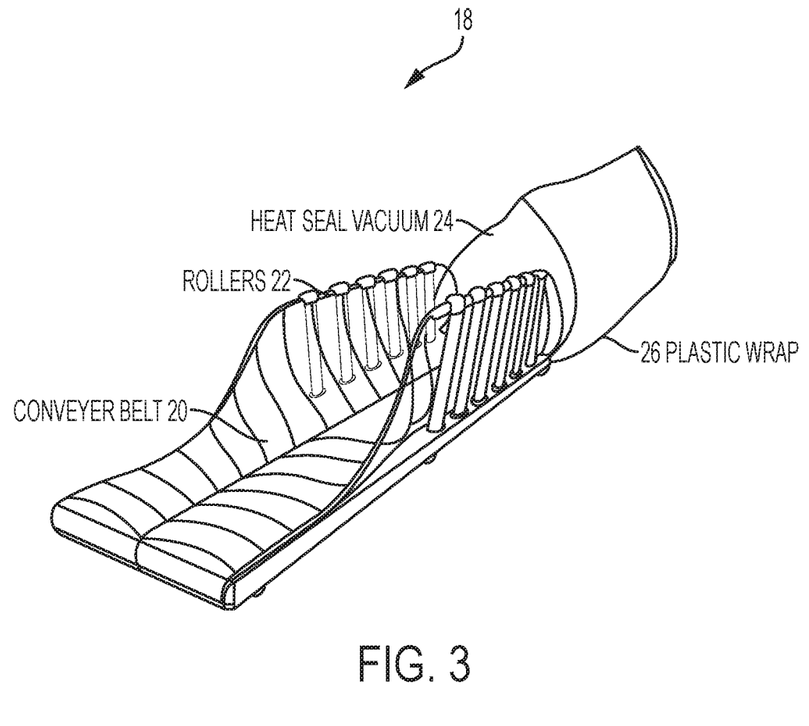
FIG. 3 is a perspective view of an alternative embodiment of an assembly for the instant invention.

With reference to FIG. 3, an alternative embodiment 18 of the instant invention is shown, having conveyor belt 20, rollers 22, heat vacuum seal 24, and plastic wrap 26. The vacuum and seal provide increased freshness and convenience for the customer. This also assists with the ultimate goal of a machine design which allows the employee to use their time elsewhere, rather than wrapping and folding a sandwich during the process. A sandwich is placed at the beginning of the conveyor system where it will be moved along through the narrowing opening housing the rollers, folding the sandwich as it forced therethrough and into a bag which will be vacuum sealed.

Figure 4:
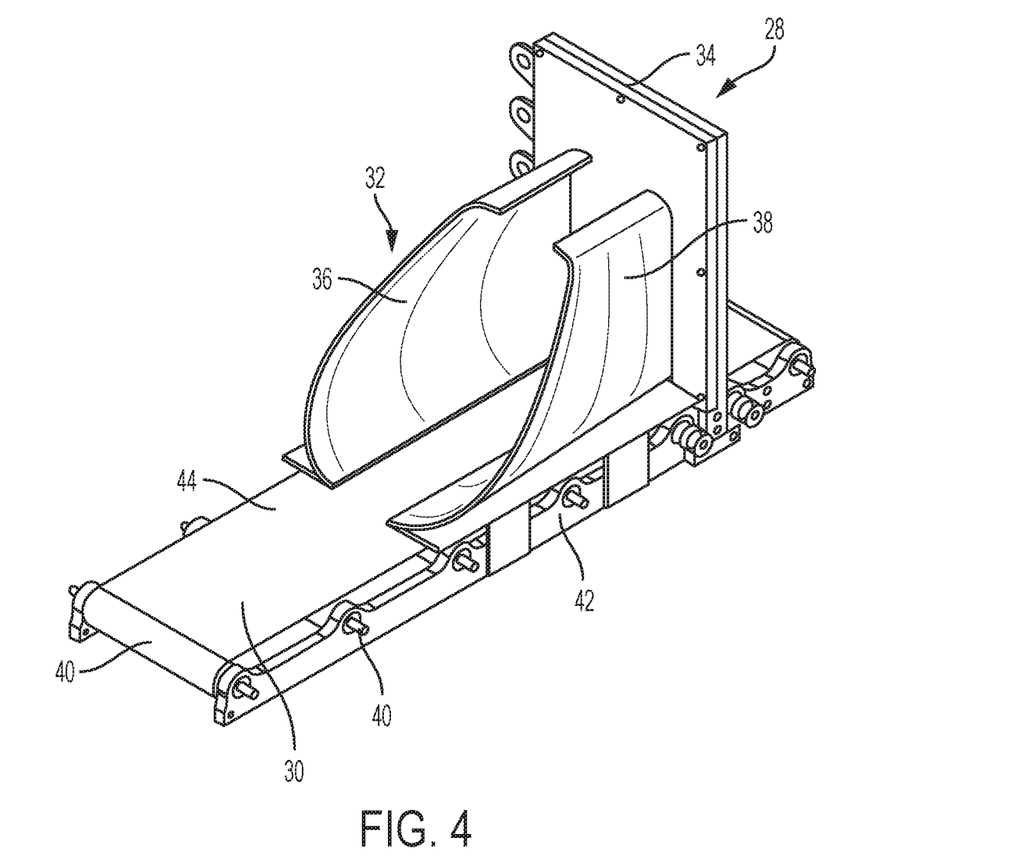
FIG. 4 is a perspective view of an alternative embodiment of an assembly for the instant invention, and including a cutting mechanism.

FIG. 4 depicts yet another alternative embodiment 28 of the novel assembly. Conveyor belt 30 is illustrated, along with folding tunnel 32 and cutter 34. Partially-open tunnel or channel 32 comprises opposite curvilinear channel members 36 and 38. The channel members function as guide plates for the tunnel. As will be further described hereinafter, each channel member has a particular curved structure, and the opening/entrance section of folding tunnel 32 is larger than the opposite exit section such that the folding tunnel converges from its entrance to its exit providing both a folding and press function. The channel members 36 and 38 are optimally shaped to be curved in three (3) dimensions about an x, y and z axis. The converging tunnel also has an upwardly sloped entrance, defined by the upwardly sloped curvature on the forward edge of each channel member, to accommodate the shape, entry and folding of the submarine sandwich.

Conveyor belt 30 includes rollers 40 with bearings, railings 42, and belt 44. It can be comprised of two separate conveyors that can be disassembled for easy maintenance and sanitation. Again, a purpose of the device is to automate the sub form and eliminate this need from the employee, such that the folding, pressing and wrapping motions are completed within the assembly.

The folding tunnel 32 provides the mechanism for folding and partially pressing the submarine sandwich as it is transported upon the conveyor belt. The channel members 36 and 38 are secured to the railings with pins or other equivalent hardware. This allows for ease in disassembly, washing and maintenance.

Cutter 34 is an optional accessory which will cut the sandwich in half prior to wrapping.

Figure 5:
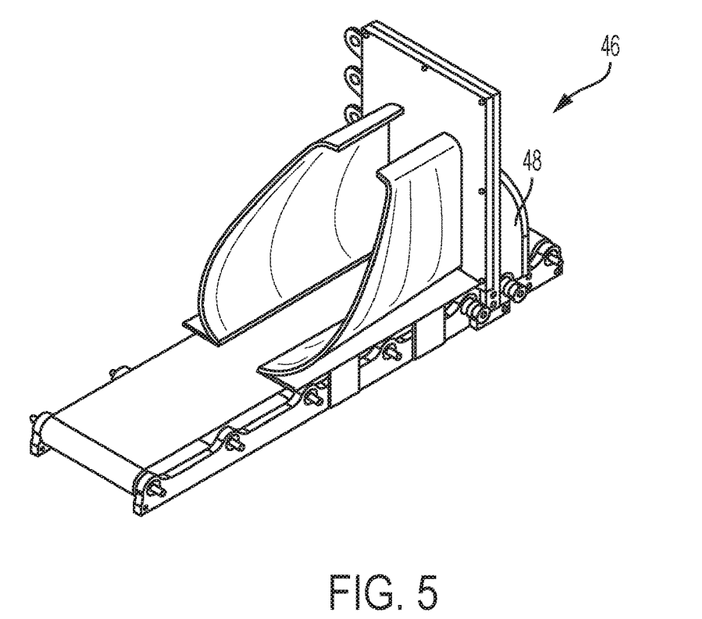
FIG. 5 is a perspective view of the assembly shown in FIG. 4, including an integral bag holder.

Turning to FIG. 5, an alternative assembly 46 to that of FIG. 4 includes bag holder 48. Instead of a separate attachable feature, bag holder 48 will simply position plastic sleeves to receive the subs.

Figure 6:
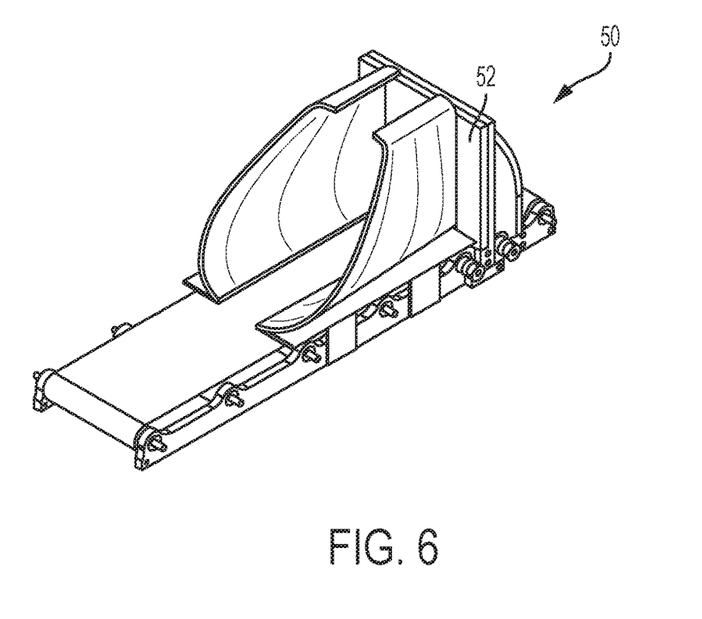
FIG. 6 is a perspective view of the assembly shown in FIG. 5, with an alternative cutting mechanism for automation.

With reference to FIG. 6, an alternative assembly 50 is shown which includes an automated cutter 52 that is changed from a vertical to a horizontal position.

Figure 7:
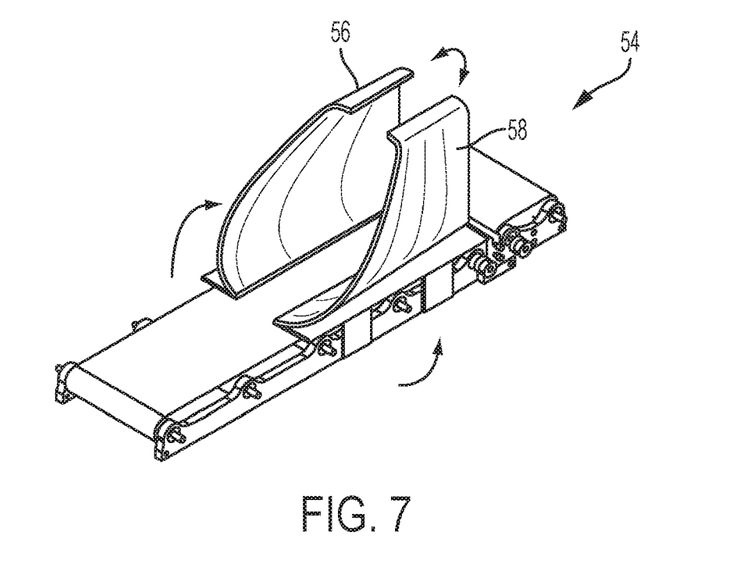
FIG. 7 is a perspective view of an alternative embodiment of an assembly for the instant invention having automated operation of the conveyor belt and folding channel.

FIG. 7 depicts an embodiment 54 of the inventions which automates the folding process, with particular focus on the folding channel and conveyor belt assembly. Curvilinear channel members 56 and 58 rotate upwardly and inwardly in accordance with the directional arrows as a submarine sandwich approaches the tunnel upon the conveyor belt. This is in contradistinction to the embodiments discussed above, in which the channel members are stationary in the upright position and secured to the rails.

Figure 8:
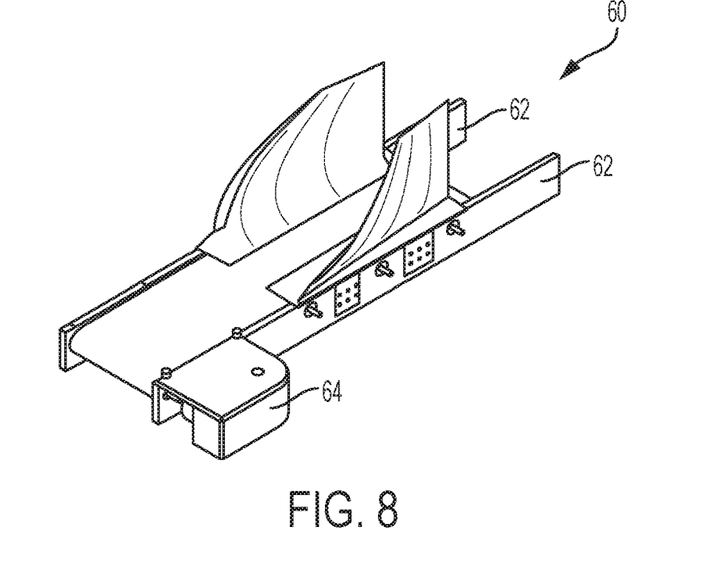
FIG. 8 is a perspective view of an alternative embodiment of an assembly for the instant invention having heat-sealing components and extended rails.

FIG. 8 illustrate an alternative embodiment 60 having several changed components. The vacuum seal features are substituted with a heat-sealing assembly. Rails 62 extend from the beginning of the unit to the end instead of being comprised of separate sections. Continuous rails 62 allow for flexibility in the placement of the bag holder and cutter. A DC motor 64 is shown as the power unit for the conveyor belt assembly.

Figure 9:
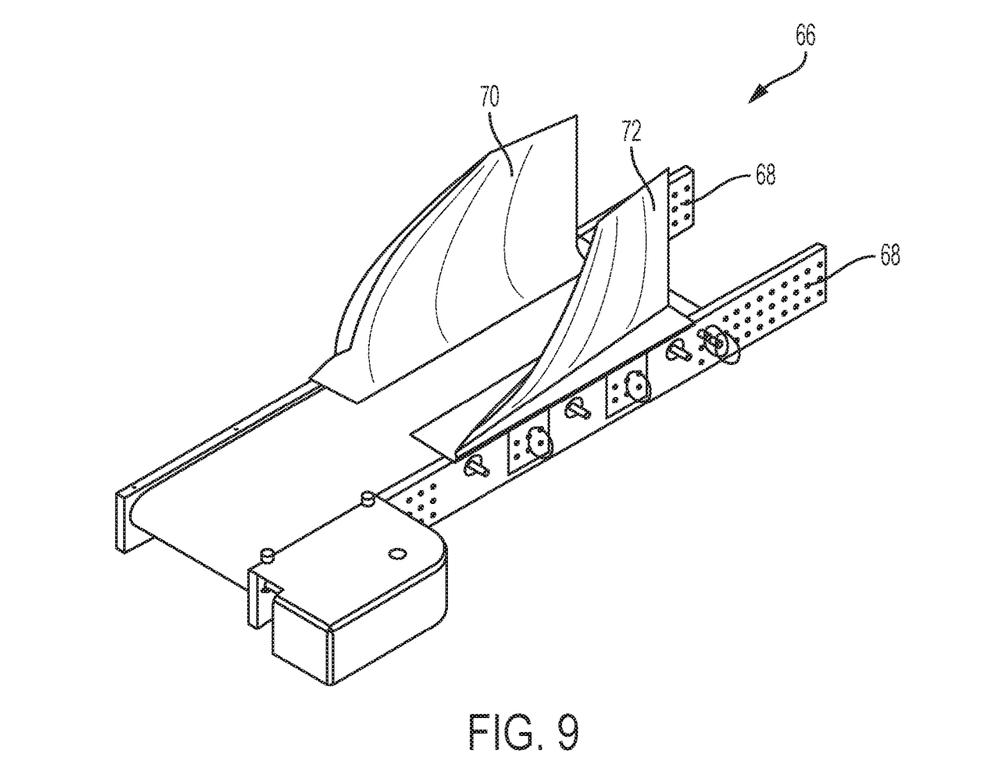
FIG. 9 is a perspective view of the assembly shown in FIG. 8, with alternative rails providing for multiple positioning of components.

With reference to FIG. 9, the assembly shown in FIG. 8 includes alternative rails 68 providing for multiple positioning of components. Rails 68 include multiple holes to optimize the location of the channel members 70 and 72 about the conveyor belt assembly. The multiple holes provide for alternative positions such that the tunnel can be alternatively placed along the conveyor belt depending upon the configuration of the restaurant facility, counter space and the like. It also allows for repositioning of the drive motor and flexibility with other components.

Figure 10:
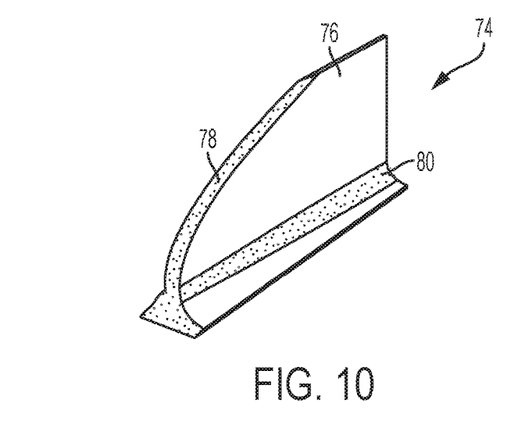
FIG. 10 is a perspective view illustrating curvature of a channel component.

FIG. 10 is a perspective view illustrating the curvature of a folding channel member 74. The channel members optimize the curvature to receive the form of a submarine sandwich, and provide the functions of folding and pressing with the correct curvature as the submarine sandwich passes through the tunnel. As mentioned above, the oppositely positioned channel members converge from entrance to exit, and also include an asymmetrical curvature about the inward surfaces which allow for folding and pressing of the sub within the tunnel. In a primary embodiment, the channel members are curved in three dimensions to optimize the converging tunnel and its operation. The curvature is complementary to the natural shape of the submarine bun, yet function as described above. Curvature is indicated in FIG. 10 with shading in multiple directions.

Figure 11:
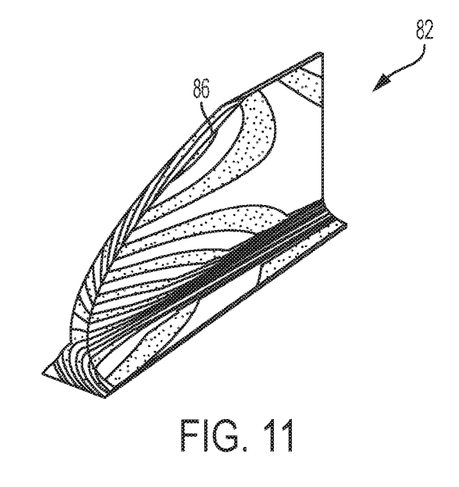
FIG. 11 is an additional perspective view illustrating curvature of a channel component.
Figure 12:
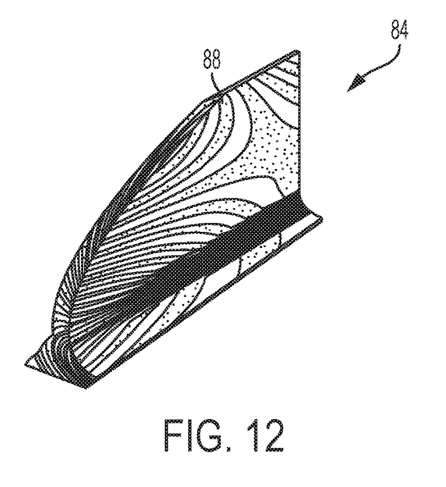
FIG. 12 is an additional perspective view illustrating curvature of a channel component.

FIGS. 11 and 12 depict the three dimensional curvature gradients 82 and 84 of channel members 86 and 88, in shading and a zebra-like manner.

Figure 13:
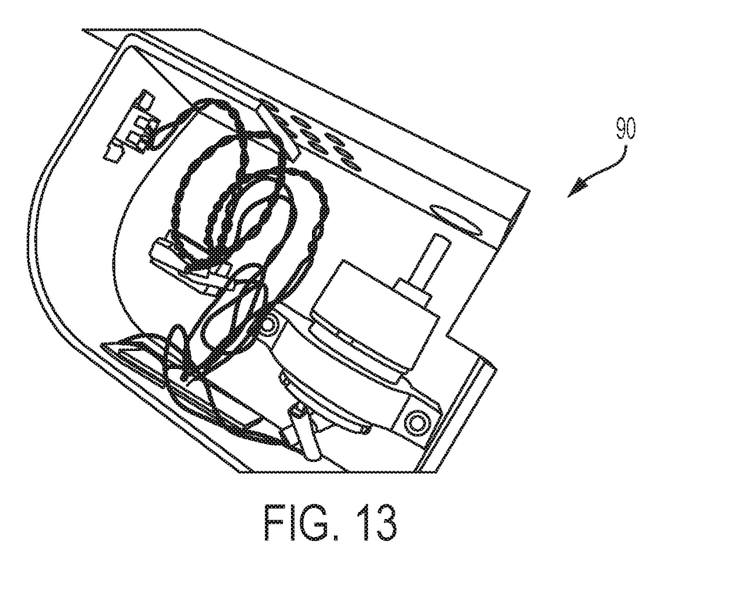
FIG. 13 is a perspective view illustrating a control board and motor utilized in the assembly.

FIG. 13 is a perspective view illustrating a control board and motor 90 utilized in the assembly.

Figure 14:
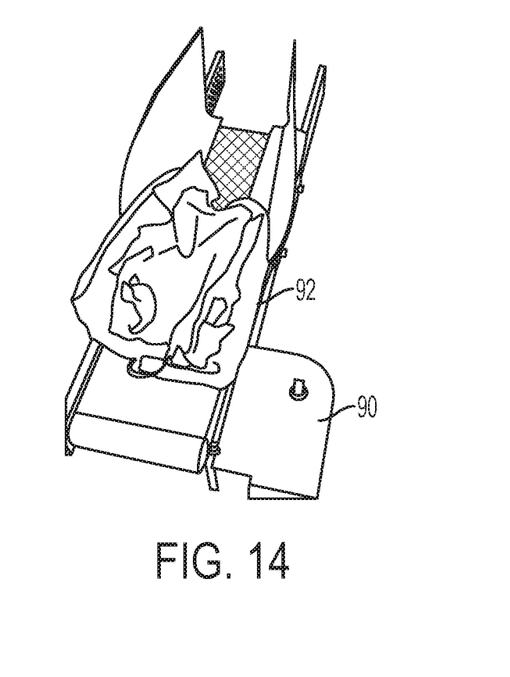
FIG. 14 is a perspective view illustrating a submarine sandwich bun placed in position on the assembly.

FIG. 14 is a perspective view illustrating an open submarine sandwich bun 90 placed in position on an assembly.

Figure 15:
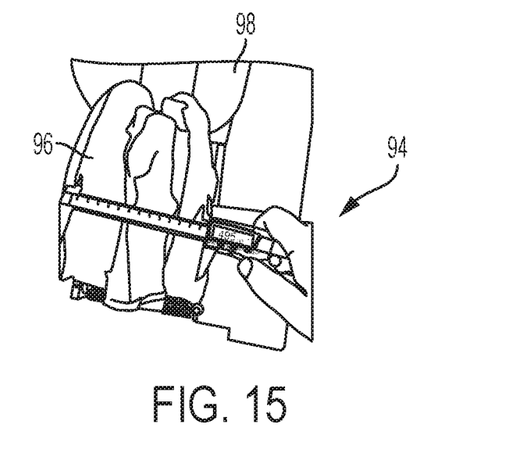
FIG. 15 is a perspective view illustrating the open dimension of a submarine sandwich bun prior to entering the folding channel of the assembly.

FIG. 15 is a perspective view 94 illustrating the open dimension of a submarine sandwich bun 96 prior to entering the folding channel 98 of the assembly. At this point, in one test, the width of the pre-folded sub measured 4.95 inches.

Figure 16:
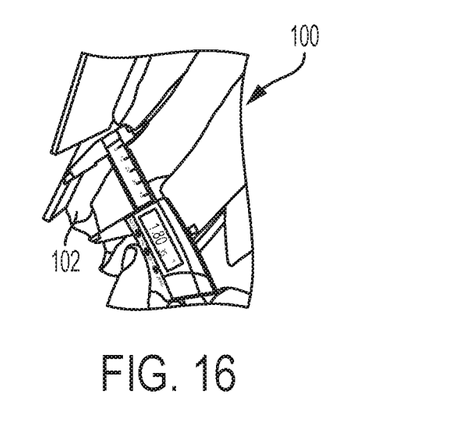
FIG. 16 is a perspective view illustrating the closed dimension of a submarine sandwich bun after leaving the folding channel of the assembly.

FIG. 16 is a perspective view illustrating the closed dimension of a submarine sandwich bun 102 after leaving the folding channel of the assembly. At this point, in the same test, the width measured 1.8 inches, establishing a size reduction of 3.15 inches.

Figure 17:
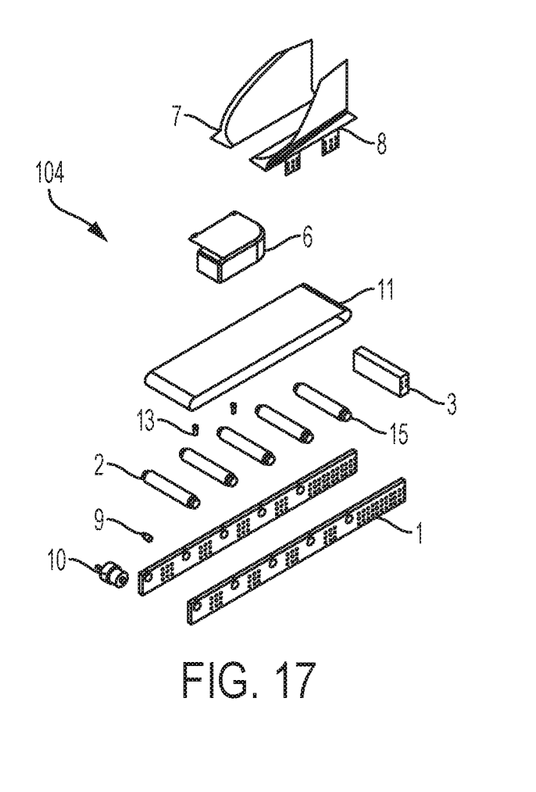
FIG. 17 is an assembly drawing illustrating the components an embodiment of the instant inventions.

FIG. 17 is an exploded assembly drawing 104 illustrating the components of an embodiment of the instant inventions described above. Guide plates 7 and 8, motor cover 6, conveyor belt 11, screws 13, shafts 2, ball bearings 15, cutting block 3, coupler 9, motor 10 and frame rails 1 are shown in relationship to one-another prior to assembly.

Figure 18A:
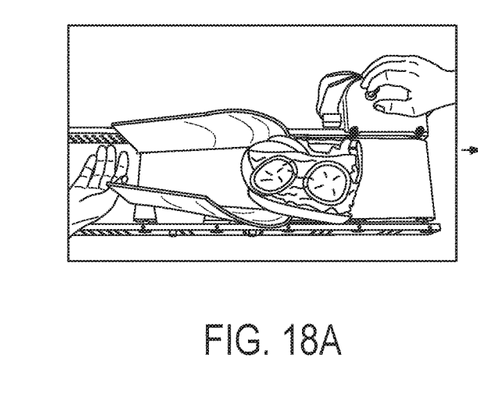
FIGS. 18A, 18B and 18C illustrate a submarine sandwich being processed within the instant inventions.
Figure 18B:
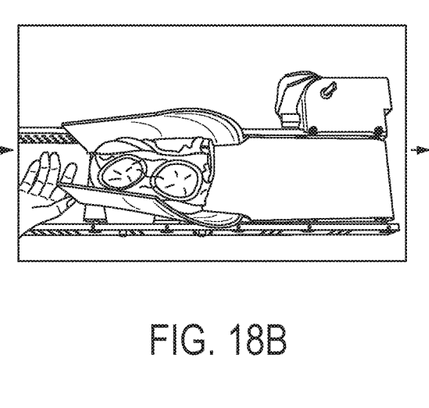
Figure 18C:
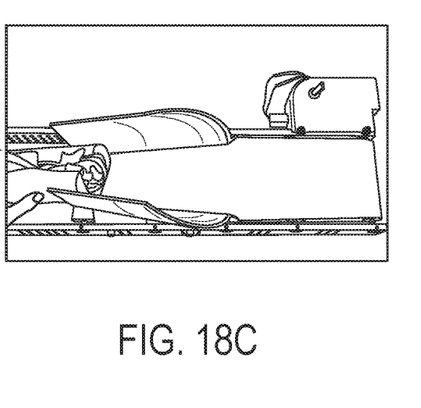

FIG. 18A is a perspective top view of a submarine sandwich bun and ingredients on the conveyor belt as it enters the converging tunnel and folding channel. FIG. 18B depicts the sandwich completely within the tunnel, and FIG. 18C represents the sandwich folded and exiting the tunnel.

The above inventions have been described and illustrated with the reference structure, components and functions. Modifications and variations thereof will occur to those of ordinary skill in the art, and it is intended such modifications and variations will be within the scope of the inventive subject matter.

What is claimed is:

1. An improved apparatus for preparation of submarine sandwiches having buns and fillings, comprising:
    a conveyor belt assembly;
    said conveyor belt assembly having a conveyor belt and drive mechanism;
    a channel, said channel mounted about and above said conveyor belt assembly and having an entrance and an exit, said conveyor belt moving therethrough;
    said channel receiving buns transported along said conveyor belt;
    said channel converging from said entrance to said exit;
    a pair of opposing complementary and curvilinear channel members forming said channel;
    said channel members having an upwardly sloped leading edge and a curvature accommodating the shape of said submarine sandwiches;
    said curvature of said channel members forming the convergence of said channel;
    said curvature converging from said entrance to a vertical height, said vertical height remaining generally constant to said exit; and
    whereby submarine sandwich buns and fillings are automatically folded and pressed when passing through said channel.

2. The apparatus of claim 1, further comprising:
    said conveyor belt assembly including side rails;
    said channel members being rotatably mounted on said side rails, and
    said channel members rotating upwardly and inwardly forming said channel.

3. The apparatus of claim 1, further comprising:
    said conveyor belt assembly including side rails; and
    said channel members being stationary and mounted on said side rails.

4. The apparatus of claim 1, further comprising:
    said channel members having a three dimensional curvature.

5. The apparatus of claim 3, further comprising:
    said conveyor belt assembly including extended side rails;
    said extended side rails extending beyond said channel; and
    said extended side rails for mounting accessory products.

6. The apparatus of claim 5, further comprising:
    a vacuum sealer, said vacuum sealer mounted on said extended side rails.

7. The apparatus of claim 5, further comprising:
    a heat sealer, said heat sealer mounted on said extended side rails.

8. The apparatus of claim 1, further comprising:
    a cutter assembly, said cutter assembly mounted about the exit of said channel.

9. The apparatus of claim 3, further comprising:
    said side rails including means for selectively positioning said channel members in multiple locations on said side rails.

10. An improved apparatus for preparation of submarine sandwiches having buns and fillings, comprising:
    a conveyor belt assembly;
    said conveyor belt assembly having a conveyor belt and drive mechanism;
    a channel, said channel mounted about and above said conveyor belt assembly and having an entrance and an exit, said conveyor belt moving therethrough;
    said channel receiving buns transported along said conveyor belt;
    said channel converging from said entrance to said exit;
    a pair of opposing complementary and curvilinear channel members forming said channel;
    said channel members having a curvature corresponding to the shape of said submarine sandwiches;

said curvature of said channel members forming the convergence of said channel;

said channel members having a vertical height, said vertical height remaining generally constant to said exit; and whereby submarine sandwich buns and fillings are automatically folded and pressed when passing through said channel.

11. The apparatus of claim 10, further comprising:

said channel members having an upwardly sloped leading edge.

12. The apparatus of claim 10, further comprising:

said channel members having a three dimensional curvature.

\* \* \* \* \*